United States Patent [19]

Szkrybalo et al.

[11] Patent Number: 5,284,374
[45] Date of Patent: Feb. 8, 1994

[54] APPARATUS FOR REMOTELY HANDLING COMPONENTS

[75] Inventors: Gregory A. Szkrybalo, Jefferson Boro, Pa.; Donald L. Griffin, West Blackfoot, Id.

[73] Assignee: The United States of America as represented by the United States Department of Energy, Washington, D.C.

[21] Appl. No.: 883,750

[22] Filed: May 15, 1992

[51] Int. Cl.⁵ .......................... B66C 1/62; G21C 19/00
[52] U.S. Cl. .................................. 294/86.4; 294/103.1; 294/906; 376/260; 376/261; 376/268
[58] Field of Search ............... 294/86.4, 90, 91, 103.1, 294/902, 906, 907; 376/233, 260, 261, 268, 270, 271

[56] References Cited

U.S. PATENT DOCUMENTS

| | | |
|---|---|---|
| 1,150,515 | 8/1915 | Grady . |
| 1,473,684 | 11/1923 | Rose . |
| 1,541,986 | 6/1925 | Martin . |
| 1,801,976 | 4/1931 | Penny ........................ 294/91 |
| 2,153,474 | 4/1939 | Naylor et al. . |
| 3,322,456 | 5/1967 | Strakhal et al. ............. 294/902 X |
| 3,851,987 | 12/1974 | Jones . |
| 3,937,514 | 2/1976 | Langowski ................. 294/90 X |
| 4,126,348 | 11/1978 | Palmer ....................... 294/90 X |
| 4,360,230 | 11/1982 | Wood et al. . |
| 4,545,723 | 10/1985 | Clark ......................... 294/86.4 X |
| 4,647,099 | 3/1987 | Berry et al. ................ 294/90 X |
| 4,652,204 | 3/1987 | Arnett ....................... 294/86.4 X |
| 4,981,316 | 1/1991 | McMahon .................. 294/90 |

Primary Examiner—David M. Mitchell
Assistant Examiner—Dean J. Kramer
Attorney, Agent, or Firm—William M. Imwalle; William R. Moser; Richard E. Constant

[57] ABSTRACT

The inventive apparatus for remotely handling bar-like components which define a longitudinal direction includes a gripper mechanism for gripping the component including first and second gripper members longitudinally fixedly spaced from each other and oriented parallel to each other in planes transverse to the longitudinal direction. Each gripper member includes a jaw having at least one V-groove with opposing surfaces intersecting at a base and extending radially relative to the longitudinal direction for receiving the component in an open end between the opposing surfaces. The V-grooves on the jaw plate of the first and second gripper members are aligned in the longitudinal direction to support the component in the first and second gripper members. A jaw is rotatably mounted on and a part of each of the first and second gripper members for selectively assuming a retracted mode in which the open end of the V-groove is unobstructed and active mode in which the jaw spans the open end of the V-groove in the first and second gripper members. The jaw has a locking surface for contacting the component in the active mode to secure the component between the locking surface of the jaw and the opposing surfaces of the V-groove. The locking surface has a plurality of stepped portions, each defining a progressively decreasing radial distance between the base of the V-groove and the stepped portion opposing the base to accommodate varying sizes of components.

2 Claims, 5 Drawing Sheets

APPARATUS FOR REMOTELY HANDLING COMPONENTS

The U.S. Government has rights in this invention pursuant to Contract No. N00024-79-C-4026 awarded by the U.S. Dept. of the Navy.

BACKGROUND OF THE INVENTION

1. Field of the Invention

The present invention relates generally to an apparatus for remotely handling bar-like components, and in particular to such an apparatus that can remotely grip, rotate, and move such components in a nuclear environment.

2. Description of Related Art

Devices for handling components in a nuclear environment are useful because they reduce the radiological hazard to workers and improve access to such components. Often these components are irradiation test trains, which have a large length to diameter ratio, and may be visualized as a long length of round bar. The test train is inserted vertically into a nuclear reactor and, when installed, the top end of the test train forms a seal with the reactor head. When a test train must be handled outside of a reactor, it presents a significant radiation and contamination hazard. These test trains are often handled, for assembly and disassembly purposes, within water pits.

The current fixture 10 (FIGS. 1-3) used to handle such test trains, includes upper and lower support members 12, 14 vertically spaced from each other by a support structure 16. The upper and lower members 12, 14 each have a plurality of different sized openings 18 (FIGS. 2 and 3) for accepting a correspondingly sized test train. The upper member 12 (FIG. 3) has a plurality of pins 22 spanning the openings 18 for actively securing the test train in the opening. The lower member 14 (FIG. 2) has no pins and only provides passive support to the test trains. In operation, the current fixture 10 requires a worker already dressed in full protective anti-contamination clothing to don a set of heavy, arm length rubber gloves. The worker must then lay on the deck of the water pit, reach into the contaminated water to remove one of several pins 22 on the upper active support member 12, and, after the test train is loaded, reinsert the pin 22. These actions expose the worker to radiation and contamination hazards. Once the test train is secure, accessibility is restricted because the worker must be careful not to fall into the water. Further, the current fixture does not rotate the test trains to allow the worker other angles of access.

U.S. Pat. No. 3,851,987 discloses a remotely controlled coupling mechanism in the drive train for nuclear reactor control elements, in which a female connector engages a male connector.

U.S. Pat. No. 1,150,515 discloses in FIG. 1 an elevator for a rod retained by a curved latch bolt.

U.S. Pat. No. 3,857,599 discloses a gripper device to remove fuel assemblies from a nuclear reactor. The gripper device has longitudinally spaced upper and lower gripping surfaces.

U.S. Pat. No. 4,360,230 discloses a self locking coupling mechanism for lifting a reactor fuel element.

U.S. Pat. Nos. 1,473,684; 1,541,986; and 2,153,474 disclose sucker rod elevators and rod clamps.

SUMMARY OF THE INVENTION

Therefore, it is an object of the present invention to provide a handling apparatus which overcomes all of the limitations in the related art, and in particular to provide a handling apparatus that can remotely handle components in a nuclear environment.

It is another object of the present invention to provide a handling apparatus capable of rotation of components.

It is another object of the present invention to provide a handling apparatus which is capable of gripping a component at more than one location simultaneously.

It is another object of the present invention to provide a handling apparatus that is capable of gripping components of various sizes.

It is another object of the present invention to provide a handling apparatus which is capable of monitoring the position of grippers securing the components.

It is a further object of the present invention to provide a handling apparatus that is capable of being programmably controlled.

These and other objects are obtained by the inventive apparatus for remotely handling bar-like components which define a longitudinal direction. The apparatus includes a gripper for gripping the component including first and second gripper members longitudinally fixedly spaced from each other and oriented parallel to each other in planes transverse to the longitudinal direction. Each gripper member includes a jaw plate having at least one V-groove with opposing surfaces intersecting at a base and extending radially relative to the longitudinal direction for receiving the component in an open end between the opposing surfaces. The V-grooves on the first and second gripper members are aligned in the longitudinal direction to support the component in the first and second gripper members.

A jaw is rotatably mounted on each of the jaw plates for the first and second gripper members for selectively assuming a retracted mode in which the open end of the V-groove is unobstructed and active mode in which the jaw spans the open end of the V-groove in the first and second gripper members. The jaw has a locking surface for contacting the component in the active mode to secure the component between the locking surface of the jaw and the opposing surfaces of the V-groove. The locking surface has a plurality of stepped portions, each defining a progressively decreasing radial distance between the base of the V-groove and the stepped portion opposing the base to accommodate varying sizes of components.

In a preferred embodiment, the apparatus also includes control means for controlling movement of the jaw in the locking mode to assume one of a plurality of locking positions corresponding to positioning one of the stepped portions opposite the base.

BRIEF DESCRIPTION OF THE DRAWINGS

A preferred embodiment of the invention will be described in detail with reference to the following drawings in which like elements bear like reference numerals and wherein.

DETAILED DESCRIPTION OF THE PREFERRED EMBODIMENT

The apparatus 42 (FIGS. 4-6) remotely handles bar-like components 20 (see FIG. 5) which define a longitudinal direction for the apparatus. The longitudinal direction is represented by dotted centerline A in FIGS. 4-6. The bar-like components 20 are preferably test trains having a large length to diameter ratio. The apparatus is preferably used in a nuclear environment, but other applications are possible. Further, the preferred embodiment will be described with reference to the vertical support of round test trains, but a horizontal orientation is applicable and the apparatus can be modified to accept geometries other than round cross sections.

Figure 2:
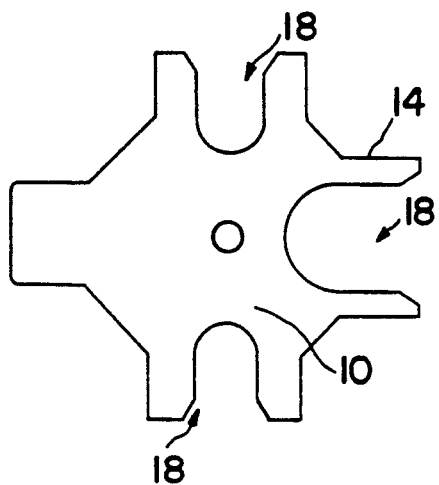
FIG. 2 is a top view illustrating a prior art passive lower support member.
Figure 1:
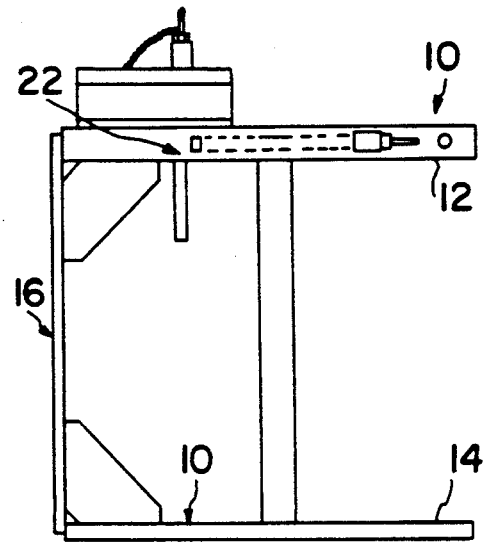
FIG. 1 is a side view illustrating a prior art apparatus having an upper active support member and a lower passive support member for holding components.
Figure 3:
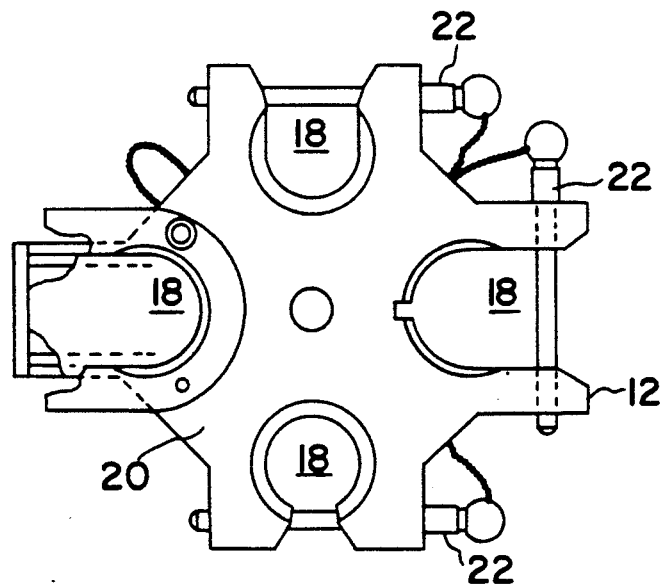
FIG. 3 is a top view illustrating a prior art active upper support member.
Figure 4:
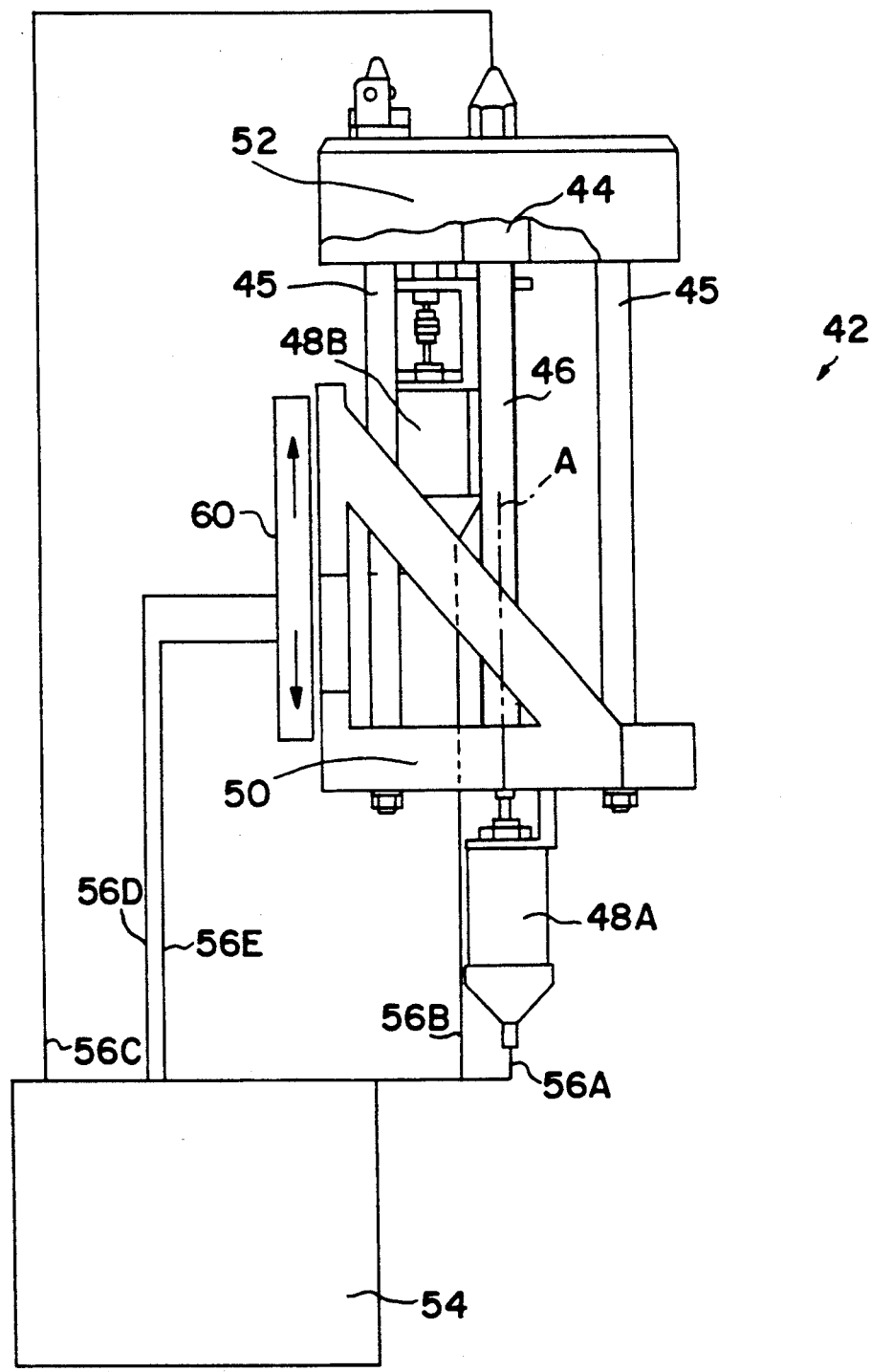
FIG. 4 is a side view illustrating a remote handling apparatus according to the preferred embodiment of the present invention.

The apparatus includes two support rings 26 (see FIG. 5), one located in the upper housing 52 and the other located in the lower housing 50 of the apparatus (see FIG. 4). The upper and lower housings 50, 52 are longitudinally spaced from each other and fixedly mounted in their relative locations by a support structure 45 (FIG. 4) which preferably maintains the upper and lower housings 50, 52 parallel to each other in a plane transverse to the longitudinal direction. The upper and lower housings 50, 52 and the support structure 45 define a stationary fixture in which other components are mounted for rotation relative to the stationary fixture. However, the stationary fixture is movable by the elevator 60 described below.

Figure 5:
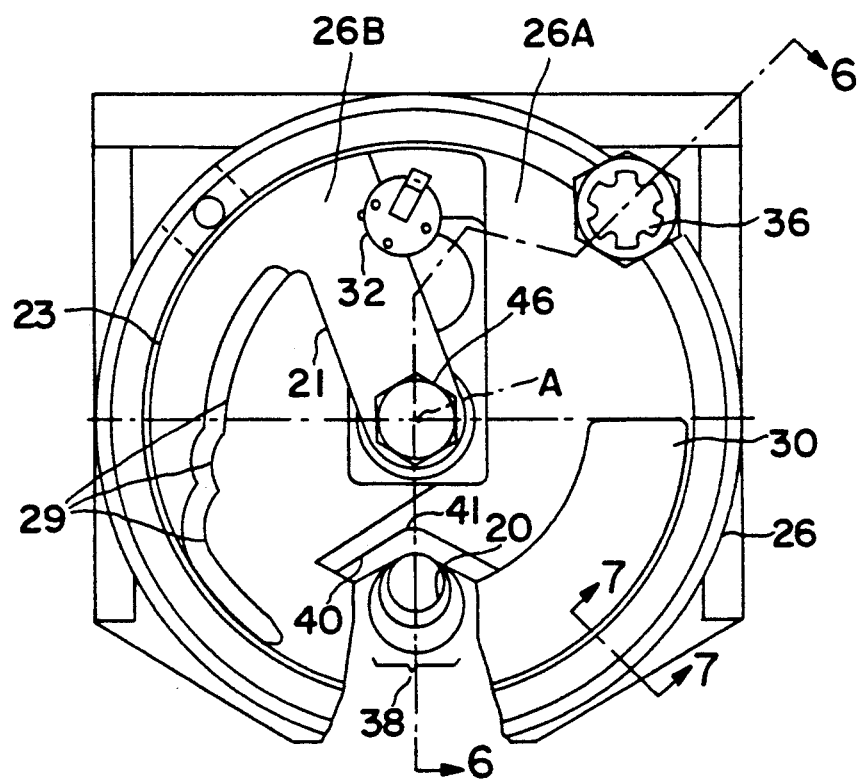
FIG. 5 is a top view illustrating a gripper assembly according to the preferred embodiment of the present invention.

As illustrated in FIG. 5, each support ring 26 preferably includes a circular jaw plate 26A and a jaw 26B. The jaw plate 26A is mounted for rotation about the centerline A, preferably by rollers 70 (FIG. 7) mounted between the support ring 26 and a roller ring 72 attached to the jaw plate 26A (through a gear plate 26C described below). The jaw plate 26A has at least one groove 38 with opposing surfaces 40 intersecting at a base 41 and extending radially relative to the longitudinal direction for receiving the component 20 in an open end of the groove between the opposing surfaces 40 and the base 41. The groove on the upper jaw plate is longitudinally aligned with the groove on the lower jaw plate to support the component 20 at two locations. The groove preferably has a V-groove shape. For clarity, the V-grooves are not illustrated in FIGS. 4 and 6.

Figure 6:
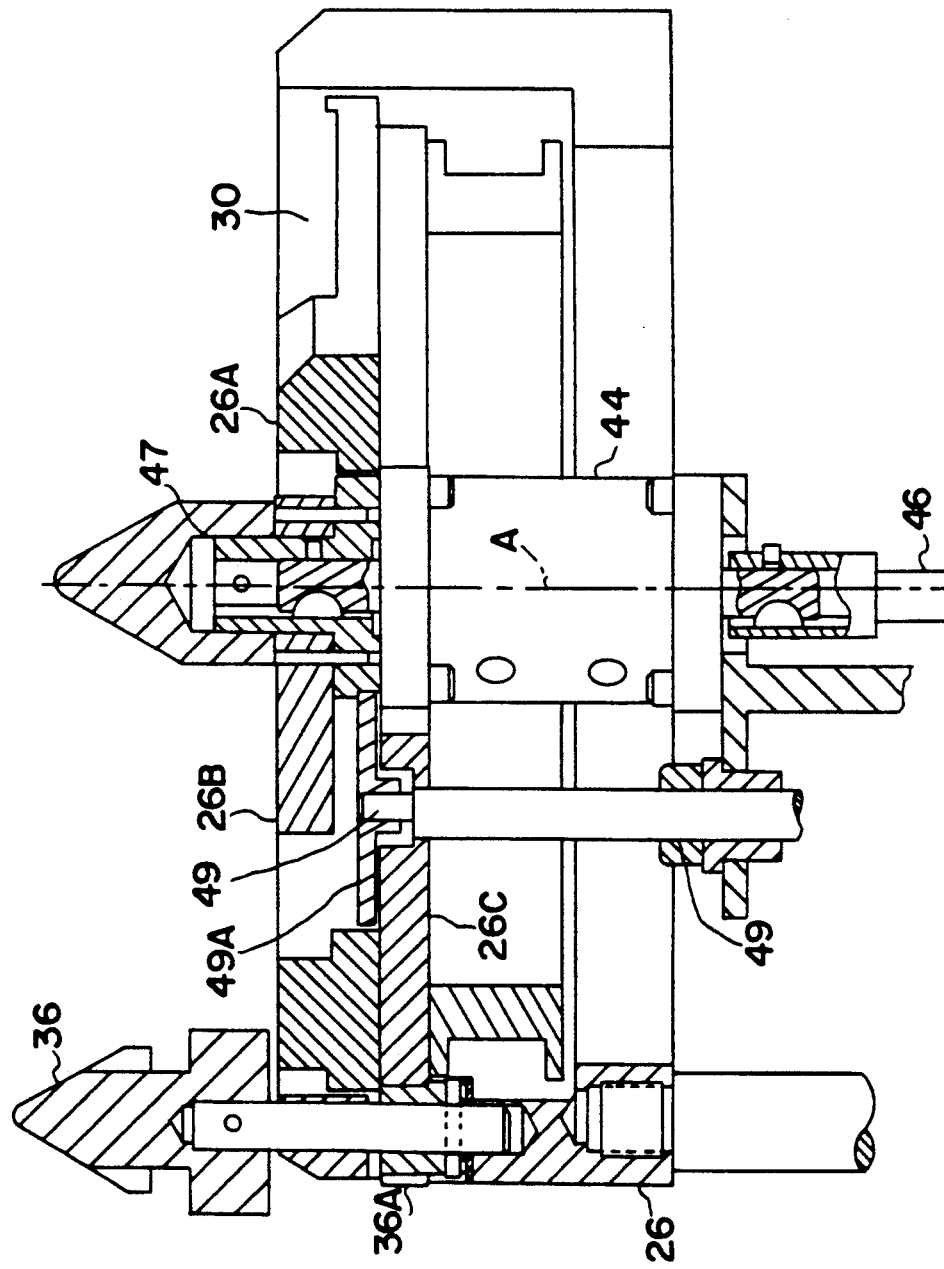
FIG. 6 is a cross-sectional view taken along the lines 6—6 of FIG. 5.
Figure 7:
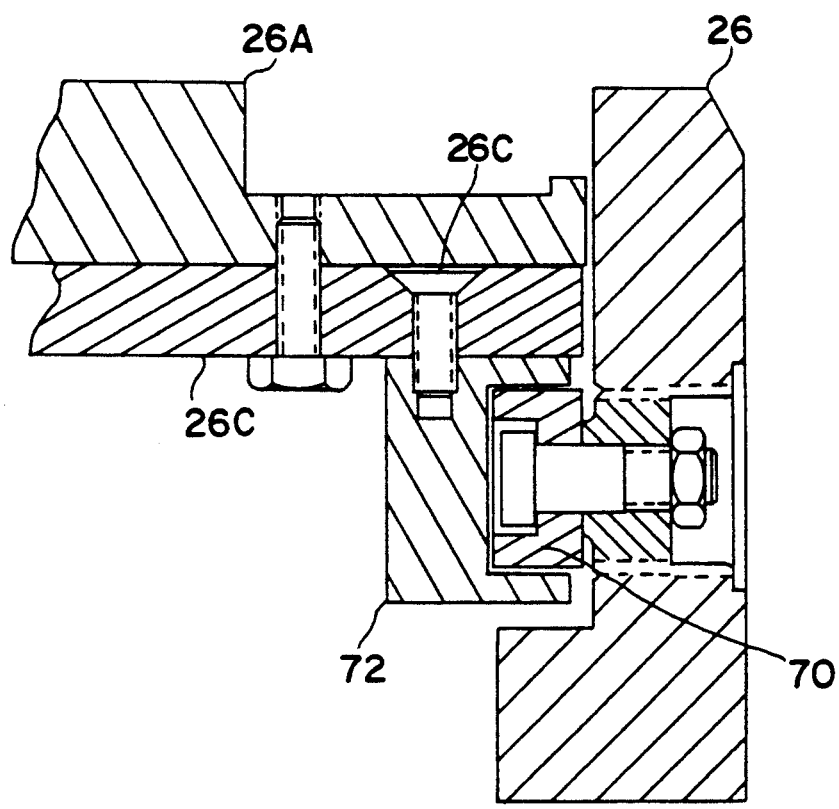
FIG. 7 is a cross-sectional view taken along the lines 7—7 of FIG. 5.

Each support ring 26 also includes a jaw 26B which is rotatably mounted on each of the upper and lower jaw plates 26A. The jaw 26B rotates on a central shaft 46 (see FIGS. 4-6) extending between the upper and lower housing 50, 52 and rotated by a gripper actuator 44 (FIGS. 4 and 6). Rotation of the jaw 26B on the upper jaw plate 26A also rotates the jaw 26B on the lower jaw plate 26A by virtue of the interconnecting central shaft 46. The jaw 26B includes a radial arm 21 and a circumferential arm 23. Actuation of the gripper actuator 44 rotates the central shaft 46 thus rotating the radial arm 21 to move the circumferential arm 23 between the retracted mode (as shown in FIG. 5) in which the open end of the V-groove is unobstructed, and an active mode in which the circumferential arm 23 of the jaw 26B spans the open end of the V-groove 38. In the active mode, portions of the circumferential jaw 23 may be received in a slot 30 in the jaw plate (FIGS. 5 and 6). Further, a lock 32 may secure the radial arm 21 in the active mode to lock the jaw 26B in position to hold the test train 20 in the V-groove. The lock 32 may include a spring biased projection (not shown) which slidingly projects against the jaw plate 26A until the projection aligns with one of a plurality of apertures (not shown) in the jaw plate 26A, at which time the spring urges the projection into the aperture to lock the jaw 26B in position. Alternatively, the lock can be manually operated to project the pin into a desired aperture.

The jaw plate 26A and jaw 26B mounted in the support ring 26 together define a gripper member for gripping the component 20. Accordingly, there are two gripper members, a first upper gripper member in the upper portion 52, and a second lower gripper member in the lower portion 50.

Further, the circumferential arm 23 has a locking surface 29 which contacts the component 20 in the active mode to secure the component 20 between the locking surface 29 of the jaw and the opposing surfaces 40 of the V-groove. The locking surface 29 will force the component 20 toward the base 41. The locking surface 29 also permits reception of test trains of various diameters (e.g., 1.0, 1.38, and 2.0 inches). A small diameter component is illustrated in FIG. 5 in solid lines, but two larger size components are also illustrated in phantom lines.

The locking surface 29 is scalloped to have a plurality of stepped portions, each being adapted to receive a test train of different diameter. More specifically, each stepped portion defines a progressively decreasing radial distance between the base of the V-groove and the stepped portion opposite the base.

The position of the jaw 26B relative to the jaw plate 26A is determined by two sensors or potentiometers 48A and 48B. The lower potentiometer 48A for the lower jaw 26B in the lower housing 50 is attached to the central shaft 46 to sense the position of the lower jaw 26B relative to the lower jaw plate 26A. The upper potentiometer 48B is connected to a potentiometer shaft 49 (FIG. 6) which in turn is connected to a gear 49A. Rotation of the central shaft 46 by the actuator 44 also rotates an adaptor 47 engaged with the gear 49A. Accordingly, rotation of the central shaft 46 is transmitted to the adaptor 47 which rotates the gear 49A which in turn rotates the potentiometer shaft 49 of the upper potentiometer 48B to sense the position of the upper jaw 26B relative to the upper jaw plate 26A.

Each jaw plate 26A and jaw 26B can be rotated within its housing 50 or 52 since the jaw plate 26A is mounted on rollers 70 within the housing 50 or 52. To rotate the jaw plate 26A, the drive nut 36 is manually rotated such that a gear 36A (FIG. 6) rotationally fixed to the drive nut 36 engages the gear plate 26C rotationally fixed to the jaw plate 26A to rotate the jaw plate 26A about the centerline A upon rotation of the drive nut 36. It is noted that rotation of the upper jaw plate by the drive nut will also rotate the lower jaw plate to maintain the vertical alignment of the V-groove.

In a preferred embodiment, the apparatus 42 is used for the remote handling of irradiated test components underwater in a nuclear environment. Accordingly, it is preferred that the apparatus 42 be made of corrosion resistant material such as stainless steel types 304 and 18-8. A small amount of bronze may be used in the bearings for relative rotation of the elements of the apparatus.

In operation, the apparatus is attached to an elevator 60 (FIG. 4) for moving the support structure vertically in the longitudinal direction. A control mechanism 54 is provided for a technician (who is located in a protected, non-contaminated area) to remotely control the operation and position of the apparatus. In operation, the technician manually sets the lock 32 to lock the jaw once it obtains the desired position in the active mode. For loading, the lock 32 is released to allow the jaw to assume the active mode. The type (e.g., size) of the component can be entered into the controller 54 so that the controller actuates the gripper actuator 44 by providing signal 56C to control movement of the jaw to assume a selected one of preferably three locking positions to place the corresponding stepped portion opposite the base of the V-groove for the correspondingly sized test component. The controller also controls the elevator 60 by providing signal 56E to an actuator within elevator 60 for setting the depth at which the apparatus will grip the test according to signal 56D from a depth sensor within elevator 60.

When the apparatus is prepared to accept the component, the component is positioned vertically into the two V-grooves and the jaw is rotated by the controller to the desired position. Preferably, the position of the jaw is monitored by two sensors or potentiometers 48A and 48B, which provide signals 56A and 56B to the controller, so that the percentage of opening or closing of the jaw can be determined. Once the component is gripped, the elevator can be operated and the component rotated about the vertical axis.

The invention has been described with reference to the preferred embodiments thereof which are intended to be illustrative rather than limiting. For example, a geometry other than a V-groove could be used. Also, while the preferred embodiment of the invention uses two gripper members 26, any number of gripper members could be used. While the preferred embodiment was designed to remotely grip and rotate components in a nuclear environment, it could also be used in any other environment. Various changes and modifications may be made without departing from the spirit and scope of the invention as defined in the following claims.

What is claimed is:

1. An apparatus for remotely handling bar-like components defining a longitudinal direction, comprising:
    gripper means for gripping the component including first and second gripper members longitudinally fixedly spaced from each other and oriented parallel to each other in planes transverse to the longitudinal direction, each gripper member including a jaw plate having at least one groove with opposing surfaces intersecting at a base and extending radially relative to the longitudinal direction for receiving the component in an open end between the opposing surfaces, the grooves on the jaw plates of the first and second gripper members being aligned in the longitudinal direction to support the component at two locations; and wherein each of said first and second gripper members further comprises jaw means rotatably mounted on each of the jaw plates of the first and second gripper members for selectively assuming a retracted mode in which the open end of the groove is unobstructed and an active mode in which the jaw means spans the open end of the groove in the first and second gripper members, the jaw means having a locking surface for contacting the component in the active mode to secure the component between the locking surface of the jaw means and the opposing surface of the groove, the locking surface having a plurality of stepped portions each defining a progressively decreasing radial distance between the base of the groove and the stepped portion opposing the base; and
    roller means for rotatably supporting the first and second gripper members, the roller means allowing rotation of the gripper members about an axis parallel to the longitudinal direction.

2. An apparatus for remotely handling bar-like components defining a longitudinal direction, comprising:
    gripper means for gripping the component including first and second gripper members longitudinally fixedly spaced from each other and oriented parallel to each other in planes transverse to the longitudinal direction, each gripper member including a jaw plate having at least one groove with opposing surfaces intersecting at a base and extending radially relative to the longitudinal direction for receiving the component in an open end between the opposing surfaces, the grooves on the jaw plates of the first and second gripper members being aligned in the longitudinal direction to support the component at two locations; and wherein each of said first and second gripper members further comprises jaw means rotatably mounted on each of the jaw plates of the first and second gripper members for selectively assuming a retracted mode in which the open end of the groove is unobstructed and an active mode in which the jaw means spans the open end of the groove in the first and second gripper members, the jaw means having a locking surface for contacting the component in the active mode to secure the component between the locking surface of the jaw means and the opposing surface of the groove, the locking surface having a plurality of stepped portions each defining a progressively decreasing radial distance between the base of the groove and the stepped portion opposing the base;
    control means for remotely controlling movement of the jaw means in the locking mode to assume one of a plurality of locking positions, each locking position corresponding to positioning one of the stepped portions opposite the base; and
    sensor means communicating with the control means for monitoring a position of the jaw means relative to the groove, said sensor means further comprising a plurality of potentiometers.

* * * * *